(12) United States Patent
Munroe et al.

(10) Patent No.: US 7,764,719 B2
(45) Date of Patent: Jul. 27, 2010

(54) PULSED FIBER LASER

(75) Inventors: Michael J. Munroe, Eugene, OR (US); Theodore Alekel, Portland, OR (US); David A. Dutton, Corvallis, OR (US); David H. Foster, Corvallis, OR (US); Joseph G. LaChapelle, Philomath, OR (US)

(73) Assignee: Deep Photonics Corporation, Bend, OR (US)

(*) Notice: Subject to any disclaimer, the term of this patent is extended or adjusted under 35 U.S.C. 154(b) by 195 days.

(21) Appl. No.: 12/168,022

(22) Filed: Jul. 3, 2008

(65) Prior Publication Data
US 2009/0046746 A1   Feb. 19, 2009

Related U.S. Application Data

(60) Provisional application No. 60/948,404, filed on Jul. 6, 2007.

(51) Int. Cl.
*H01S 3/30* (2006.01)
(52) U.S. Cl. ............................................ 372/6; 372/22
(58) Field of Classification Search ................ 372/6, 372/29.014, 25, 69, 22
See application file for complete search history.

(56) References Cited

U.S. PATENT DOCUMENTS

| | | | |
|---|---|---|---|
| 5,673,280 A * | 9/1997 | Grubb et al. | 372/3 |
| 5,699,377 A | 12/1997 | Pan | |
| 6,014,249 A | 1/2000 | Fermann et al. | |
| 6,275,512 B1 * | 8/2001 | Fermann | 372/6 |
| 6,347,007 B1 * | 2/2002 | Grubb et al. | 359/337.21 |
| 6,434,302 B1 | 8/2002 | Fidric et al. | |
| 6,671,293 B2 | 12/2003 | Kopp et al. | |
| 7,139,116 B1 * | 11/2006 | Vaissie et al. | 359/333 |

OTHER PUBLICATIONS

Jeong et al., "Single-mode plane-polarized ytterbium-doped large-core fiber laser with 633-W continuous-wave output power" Optics Letters, 30(9):955-957 (2005).
Kovalev et al., "Suppression of stimulated Brillouin scattering in high-power single-frequency fiber amplifiers," Optics Letters, 31(2):161-163 (2006).

* cited by examiner

*Primary Examiner*—Minsun Harvey
*Assistant Examiner*—Tuan Nguyen
(74) *Attorney, Agent, or Firm*—Townsend and Townsend and Crew LLP

(57) ABSTRACT

A fiber laser system includes a master oscillator configured to generate linear polarized infrared laser radiation with wavelengths of 1015-1085 nm, pulses with durations of 100 ps to 10 ns, pulse train repetition rates of 1 kHz to 10 MHz, spectral bandwidth less than 0.5 nm, and a predominately single spatial mode and a polarization-maintaining optical isolator optically coupled to the master oscillator. The fiber laser system also includes a fiber amplifier system optically coupled to the optical isolator and including a power amplifier configured to amplify the laser radiation transmitted through the optical isolator. The power amplifier includes a polarization-maintaining, large-mode-area, multiple-clad Yb-doped gain fiber having a core, an inner cladding, and at least an outer cladding, one or more diode pump lasers emitting pump light of a nominal wavelength of 976 nm, and a pump coupler configured to couple the pump light into the gain fiber.

26 Claims, 12 Drawing Sheets

PULSED FIBER LASER

CROSS-REFERENCES TO RELATED APPLICATIONS

The present application claims benefit under 35 U.S.C. §119(e) of U.S. Provisional Patent Application No. 60/948,404, filed on Jul. 6, 2007, entitled "Pulsed Fiber Laser," the disclosure of which is hereby incorporated by reference in its entirety for all purposes.

BACKGROUND OF THE INVENTION

The present invention relates generally to the field of optical systems. More particularly, the present invention relates to high performance pulsed laser sources that operate with high power, narrow spectral linewidths, and freedom to adjust pulse parameters and characteristics. Embodiments of the present invention are useful in a variety of applications including nonlinear frequency conversion laser systems, light detection and ranging (LIDAR) systems, laser-based remote sensing systems, laser-based communications systems, and the like.

Fiber lasers have advanced to become economical and efficient high power infrared laser sources. Average optical output powers of tens of kilowatts are currently available in commercial fiber laser systems. FIG. 1 is a schematic of a conventional fiber laser 100 including a master oscillator fiber amplifier (MOFA) architecture. The master oscillator 110 (also known as the seed laser) emits a low power optical signal that is coupled into the amplifier section 130 through an optical isolator 120. The optical isolator protects the master oscillator from any light counter propagating back through the amplifier section. The amplifier section consists of a length of gain fiber that is pumped by one or more pump lasers 140 (typically diode lasers) through a pump coupler 150. The gain fiber may be multi or single spatial mode, polarization random or maintaining, cladding pumped or core pumped, and may have a variety of dopants (for example Yb, Er, Nd, Pr, etc.) depending on the emission and pumping wavelengths. The pump laser light is absorbed by the dopants in the gain fiber, raising the dopants into an excited state. The emission from the master oscillator is amplified through stimulated emission as it interacts with the excited dopants implanted in the fiber core.

Although high power, continuous wave fiber lasers have found use in some applications, there is a need in the art for improved pulsed fiber laser systems.

SUMMARY OF THE INVENTION

According to an embodiment of the present invention, a fiber laser system is provided. The fiber laser system is capable of simultaneously generating linearly-polarized laser radiation with peak powers from 10 kW to 500 kW, wavelengths of 1015-1085 nm, pulses with durations of 100 ps to 10 ns, pulse train repetition rates of 1 kHz to 10 MHz, average powers of 10-300 W, spectral bandwidth less than 0.5 nm, and a predominately single spatial mode. The fiber laser system includes a master oscillator configured to generate linear polarized infrared laser radiation with wavelengths of 1015-1085 nm, pulses with durations of 100 ps to 10 ns, pulse train repetition rates of 1 kHz to 10 MHz, spectral bandwidth less than 0.5 nm, and a predominately single spatial mode. The fiber laser system also includes a polarization-maintaining optical isolator optically coupled to the master oscillator. The fiber laser system further includes a fiber amplifier system optically coupled to the optical isolator and including a power amplifier configured to amplify the linear polarized infrared laser radiation transmitted through the optical isolator. The power amplifier includes a polarization-maintaining, large-mode-area, multiple-clad Yb-doped gain fiber having a core, an inner cladding, and at least an outer cladding, one or more diode pump lasers emitting pump light of nominal wavelength 976 nm, and a pump coupler configured to couple the pump light into the inner cladding of the gain fiber.

According to another embodiment of the present invention, a frequency conversion system is provided. The frequency conversion system includes a master oscillator configured to generate linear polarized infrared laser radiation with pulses with durations of 100 ps to 10 ns, pulse train repetition rates of 1 kHz to 10 MHz, spectral bandwidth less than 0.5 nm, and a predominately single spatial mode and a polarization-maintaining optical isolator optically coupled to the master oscillator. The frequency conversion system also includes a fiber amplifier system optically coupled to the optical isolator and including a power amplifier configured to amplify the linear polarized infrared laser radiation transmitted through the optical isolator. The frequency conversion system further includes an optical system optically coupled to the fiber amplifier system and a nonlinear optical element configured to receive the amplified linear polarized infrared laser radiation from the fiber amplifier system and output frequency converted radiation.

According to a particular embodiment of the present invention a fiber laser system capable of simultaneously generating linearly-polarized laser radiation with peak powers from 10 kW to 500 kW, wavelengths of 1500-1575 nm, pulses with durations of 100 ps to 10 ns, pulse train repetition rates of 1 kHz to 10 MHz, average powers of 10-300 W, narrow spectral bandwidth less than 0.5 nm, and a predominately single spatial mode is provided. The fiber laser system includes a master oscillator that generates linear polarized infrared laser radiation with a wavelength between 1500-1575 nm, pulses with duration between 100 ps and 10 ns, a pulse train repetition rate between 1 kHz and 10 MHz, a spectral bandwidth less than 0.5 nm, and a predominately single spatial mode. The fiber laser system also includes a polarization-maintaining optical isolator configured to attenuate radiation propagating toward the master oscillator and transmitting the linear polarized laser radiation propagating away from the master oscillator. The fiber laser system further includes a fiber amplifier optically coupled to the optical isolator and configured to amplify the linear polarized laser radiation transmitted through the optical isolator. The fiber amplifier includes a polarization-maintaining, large-mode-area, double-clad Er-doped gain fiber, one or more diode pump lasers emitting light of nominal wavelength 980 nm, and an optical coupler configured to couple light emitted from the one or more diode pump lasers into the double-clad Er-doped gain fiber.

According to a specific embodiment of the present invention the use of a laser as a light source for a LIDAR system is provided. The use includes illuminating a target with linearly-polarized laser radiation characterized by a peak power ranging from 10 kW to 500 kW, a pulse width ranging from 100 ps to 10 ns, a pulse train repetition rate ranging from 1 kHz to 10 MHz, an average power ranging from 10-300 W, a spectral bandwidth less than 0.5 nm, and a predominately single spatial mode.

According to another specific embodiment of the present invention, the use of a laser as a light source in a micro-machining system is provided. The use includes illuminating a workpiece with linearly-polarized laser radiation characterized by a peak power ranging from 10 kW to 500 kW, a wavelength ranging from 1500-1575 nm, a pulse width ranging from 100 ps to 10 ns, a pulse train repetition rate ranging from 1 kHz to 10 MHz, an average power ranging from 10-300 W, a spectral bandwidth less than 0.5 nm, and a predominately single spatial mode.

According to an alternative specific embodiment of the present invention, the use of a laser as a light source in nonlinear optical frequency conversion is provided. The use includes illuminating a nonlinear optical element (e.g., one or more frequency doubling crystals) with linearly-polarized laser radiation characterized by a peak power ranging from 10 kW to 500 kW, a wavelength ranging from 1500-1575 nm, a pulse width ranging from 100 ps to 10 ns, a pulse train repetition rate ranging from 1 kHz to 10 MHz, an average power ranging from 10-300 W, a spectral bandwidth less than 0.5 nm, and a predominately single spatial mode.

The fiber laser apparatus described herein has the novel ability to simultaneously generate linearly-polarized laser radiation with peak powers from 10 kW to 500 kW, wavelengths of 1015-1085 nm or 1500-1575 nm, pulses with durations of 100 ps to 10 ns, pulse train repetition rates of 1 kHz to 10 MHz, average powers of 10-300 W, narrow spectral bandwidth less than 0.5 nm, and a predominately single spatial mode. The components uniquely selected to achieve these characteristics include a master oscillator that generates linear polarized infrared laser radiation, a polarization-maintaining optical isolator that attenuates the backward propagating light from the fiber amplifier while transmitting the forward propagating light from the master oscillator, and a fiber amplifier that contains a power amplifier that amplifies the master oscillator emission transmitted through the isolator, including a polarization-maintaining, large-mode-area, double-clad {Yb-, Er-, Yb:Er-} doped gain fiber, one or more diode pump lasers typically based upon AlGaAs/GaAs designs that emit light of selected wavelengths from a range 975-985 nm, and a pump coupler configured to couple the emission from the diode pump lasers into the cladding of the gain fiber.

Embodiments of the present invention described herein have the capability to increase average output power without increasing nonlinear fiber impairments caused by higher peak power. Similarly, the pulse width may be altered without changing the average power. Also, peak power can be modified as the repetition rate is changed without altering the average power due to the saturation of the power amplifier stage. The agile nature of the fiber laser emission as described by the invention herein is unique among high power laser systems.

Many variants of the above design are used, including but not limited to multiple gain stages with multiple pumps, the inclusion of various filtering elements, a delivery fiber at the output of the laser, and use of forward and/or backward propagating pumps. Fiber lasers can operate with a wide range of output parameters to satisfy the varying constraints of an application. It is the specifications of the individual fiber amplifier subsystems that determine the output emission. The output emission of a fiber laser can be specified with the average output optical power, peak output optical power, temporal pulse width, center optical wavelength, polarization, spatial mode, and spectral bandwidth. Pumping limitations, gain limitations, optical damage to components, and nonlinear impairments require a unique system design of the elemental blocks of a fiber laser to achieve the desired set of output parameters.

Fiber lasers are of particular interest as an efficient and compact pulsed source for nonlinear frequency conversion from near infrared (NIR) to visible wavelengths. Nonlinear frequency conversion requires high peak power, narrow optical bandwidth, linear polarization, and single spatial mode. However, it has not yet been practical to simultaneously satisfy these requirements in a pulsed fiber lasers due to nonlinear impairments. In particular, Stimulated Brillouin Scattering (SBS), Stimulated Raman Scattering (SRS), and Self Phase Modulation (SPM) limit the performance of fiber lasers. These nonlinear impairments increase with higher peak intensity in the fiber, with narrower spectral bandwidth, and by propagating linear polarized light. Examples of mode-locked fiber lasers are known in the art that reduce nonlinear impairments because of the large natural bandwidth of the femtosecond (fs) pulses they create, as well as nanosecond (ns) pulsed fiber lasers that use a master oscillator with artificially high optical bandwidth to reduce nonlinearities. Similarly, fiber lasers with kilowatt (kW) average power are known in the art. These lasers function in continuous wave operation, and do not approach the 10-500 kW peak power in a single spatial mode and linear polarization necessary for efficient frequency conversion.

The fiber laser apparatus described herein is capable of simultaneously generating linearly-polarized laser radiation with peak powers from 10 kW to 500 kW, wavelengths of 1015-1085 nm or 1500-1575 nm, pulses with durations of 100 ps to 10 ns, pulse train repetition rates of 1 kHz to 10 MHz, average powers of 10-300 W, narrow spectral bandwidth less than 0.5 nm, and a predominately single spatial mode. Embodiments of the present invention have the capability to increase average output power without increasing nonlinear fiber impairments caused by higher peak power. Similarly, the pulse width may be varied without changing the average power. Also, peak power can be modified as the repetition rate is changed without altering the average power due to the saturation of the power amplifier stage. The agile nature of the fiber laser emission characteristics as described by the invention is unique among high power laser systems.

According to an embodiment of the present invention, a fiber laser system capable of simultaneously generating linearly-polarized laser radiation with peak powers from 10 kW to 500 kW, wavelengths of 1015-1085 nm, pulses with durations of 100 ps to 10 ns, pulse train repetition rates of 1 kHz to 10 MHz, average powers of 10-300 W, narrow spectral bandwidth less than 0.5 nm, and a predominately single spatial mode is provided. The fiber laser system includes a master oscillator that generates linear polarized infrared laser radiation with wavelengths of 1015-1085 nm, pulses with durations of 100 ps to 10 ns, pulse train repetition rates of 1 kHz to 10 MHz, narrow spectral bandwidth less than 0.5 nm, and a predominately single spatial mode. The master oscillator may be a frequency-controlled diode laser pumped by an electric current pulse, a frequency controlled CW diode laser coupled to an external electro-optic modulator, or a diode-pumped solid-state laser.

The fiber laser system also includes a polarization-maintaining optical isolator that attenuates the backward propagating light from the fiber amplifier while transmitting the forward propagating light from the master oscillator.

The fiber laser system further includes a fiber amplifier containing a power amplifier that amplifies the master oscillator emission transmitted through the isolator, comprising a polarization-maintaining, large-mode-area, double-clad Yb-doped gain fiber, one or more diode pump lasers emitting light of a nominal wavelength of 976 nm, and a pump coupler that couples the emission from the diode pump lasers into the cladding of the gain fiber. The pumping source for the power amplifier may be one or more laser diode bar arrays or one or more single emitter laser diodes. The pump coupler for the power amplifier may be an {n×1×1} fused star coupler, with n being an integer greater than or equal to one.

In a specific embodiment, the fiber laser system further includes one or more preamplifier stages preceding the power amplifier, each preamplifier stage comprises a polarization-maintaining doped gain fiber, one or more pumps energizing the gain fiber, a pump coupler to couple the pump power into the cladding or core of the gain fiber, and an optical isolator between the preamplifier and the subsequent preamplifier or power amplifier.

In another specific embodiment, the fiber laser system also includes a large mode area polarization delivery fiber of length less than or equal to 5 m that guides the emission from the pump amplifier to the application point. In yet another specific embodiment, the fiber laser system additionally includes means of temperature-controlling the pump amplifier gain fiber with a predetermined temperature gradient along the length of the gain fiber. In another particular embodiment, the fiber laser system also includes means of adjusting the temporal pulse width and repetition rate of the master oscillator emission with the result of varying the fiber laser emission peak power and average power.

Embodiments of the present invention may be used in a nonlinear frequency conversion laser system, a light detection and ranging (LIDAR) system, a laser-based micromachining system, a laser-based defect inspection system, a laser-based treatment or analysis system for use with biological tissues or processes, a laser-based remote sensing system, a laser-based communications system, combinations thereof, or the like.

According to another embodiment of the present invention, a fiber laser system capable of simultaneously generating linearly-polarized laser radiation with peak powers from 10 kW to 500 kW, wavelengths of 1500-1575 nm, pulses with durations of 100 ps to 10 ns, pulse train repetition rates of 1 kHz to 10 MHz, average powers of 10-300 W, narrow spectral bandwidth less than 0.5 nm, and a predominately single spatial mode is provided. The fiber laser systems includes a master oscillator that generates linear polarized infrared laser radiation with wavelengths of 1500-1575 nm, pulses with durations of 100 ps to 10 ns, pulse train repetition rates of 1 kHz to 10 MHz, narrow spectral bandwidth less than 0.5 nm, and a predominately single spatial mode. The master oscillator may be a frequency controlled diode laser pumped by an electric current pulse, a frequency controlled CW diode laser coupled to an external electro-optic modulator, or a diode pumped solid state laser.

The fiber laser systems also includes a polarization-maintaining optical isolator that attenuates the backward propagating light from the fiber amplifier while transmitting the forward propagating light from the master oscillator.

The fiber laser system further includes a fiber amplifier containing a power amplifier that amplifies the master oscillator emission transmitted through the isolator, comprising a polarization-maintaining, large-mode-area, double-clad Er-doped gain fiber, one or more diode pump lasers emitting light of nominal wavelength 980 nm, and a pump coupler to couple the emission from the diode pump lasers into the cladding of the gain fiber. In an embodiment, the pump coupler for the power amplifier is an {n×1×1} fused star coupler with n being an integer greater than or equal to one. The pumping source for the power amplifier may be one or more laser diode bar arrays or one or more single emitter laser diodes.

In a specific embodiment, the fiber laser system further includes one or more preamplifier stages preceding the power amplifier, each preamplifier stage comprising a polarization-maintaining doped gain fiber, one or more pumps energizing the gain fiber, a pump coupler for coupling the pump power into the cladding or core of the gain fiber, and an optical isolator between the preamplifier and the subsequent preamplifier or power amplifier.

In another specific embodiment, the fiber laser system further includes a large mode area polarization delivery fiber of length less than or equal to 5 m that guides the emission from the pump amplifier to the application point. In yet another specific embodiment, the fiber laser system additionally includes means of temperature controlling the pump amplifier gain fiber with a predetermined temperature gradient along the length of the gain fiber. In an alternative embodiment, the fiber laser system also includes means of adjusting the temporal pulse width and repetition rate of the master oscillator emission with the result of varying the fiber laser emission peak power and average power.

Embodiments of the present invention may be used in a variety of applications including a nonlinear frequency conversion laser system, a light detection and ranging (LIDAR) system, a laser-based micromachining system, a laser-based defect inspection system, a laser-based treatment or analysis system for use with biological tissues or processes, a laser-based remote sensing system, a laser-based communications system, combinations thereof, or the like.

Numerous benefits are achieved using the present invention over conventional techniques. For example, in an embodiment according to the present invention, fiber laser systems suitable for highly efficient harmonic conversion are provided that are characterized by high peak power, high beam quality, degree of linear polarization, and narrow linewidth. The operating characteristics of the lasers provided by embodiments of the present invention open up opportunities for applications (e.g., LIDAR) that are not suitably addressed by conventional systems. Various additional objects, features and advantages of the present invention can be more fully appreciated with reference to the detailed description and accompanying drawings that follow.

DETAILED DESCRIPTION OF SPECIFIC EMBODIMENTS

Figure 1:
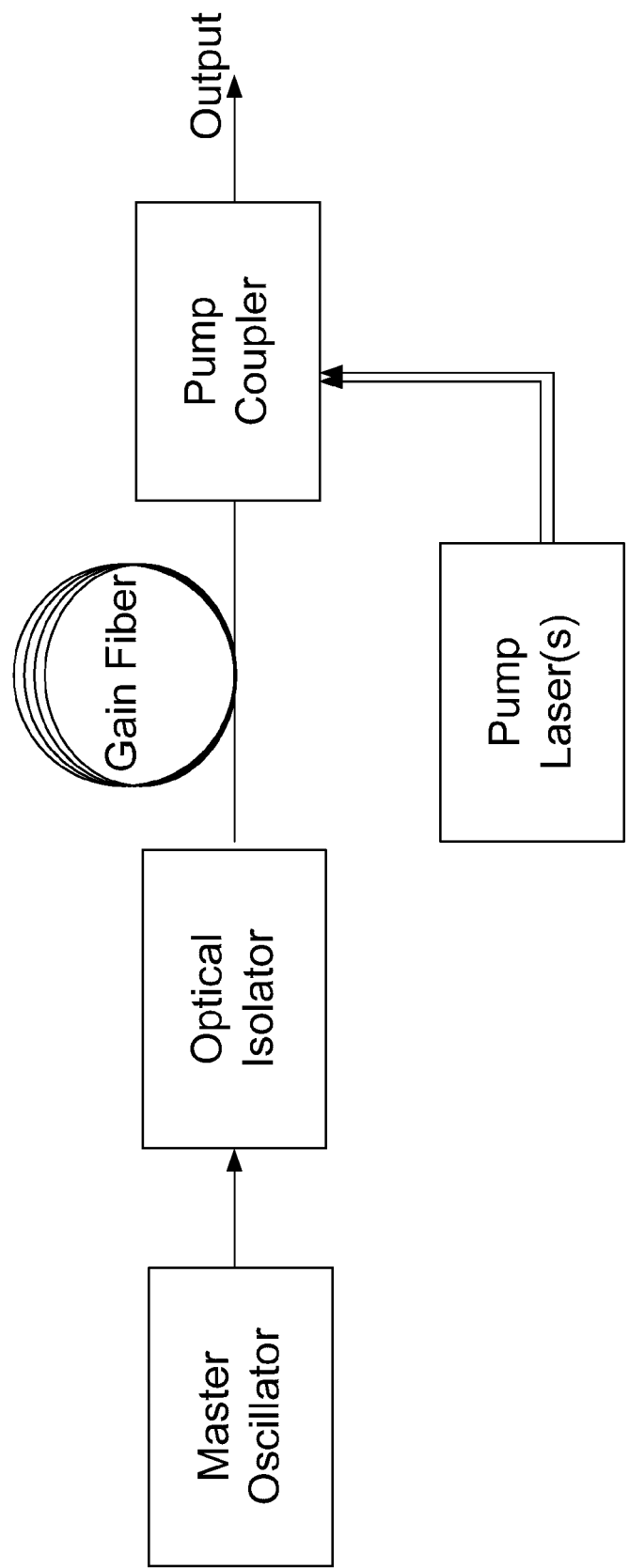
FIG. 1 is a schematic of a conventional fiber laser.

Without limiting embodiments of the present invention, the following glossary is provided in relation to the description herein.

Deep ultraviolet (DUV): A portion of the electromagnetic spectrum with wavelengths from 100-315 nm.

Diode Laser: A light-emitting diode designed to use stimulated emission to generate a coherent light output. Diode lasers are also known as laser diodes or semiconductor lasers.

Diode-Pumped Laser: A laser having a gain medium that is pumped by a diode laser.

Double-clad fiber: An optical fiber that contains a core region that guides a first light signal, surrounded by a first cladding region that contains the first light signal within the core. The first cladding region also guides a second light signal. The first cladding region is surrounded by a second cladding region that contains the second light signal in the first cladding region.

Fiber Laser: A laser may be constructed using an optical fiber as the gain medium and are pumped with optical energy. Fibers are typically glass-type materials, though may be crystalline or glass-nano-crystal composites.

Harmonic Generation: With relation to radiant energy, the conversion of electromagnetic radiation having a given frequency into radiation having a multiple of the frequency. This can occur when an intense directional light beam passes through a nonlinear optical medium.

Infrared Radiation: electromagnetic radiation characterized by a wavelength between about 700 nm and about 5000 nm.

Large Mode Area Fiber: A fiber with a mode area larger than that of typical single mode step index fiber. The fibers typically support the propagation of a single to few spatial modes. Several examples of large mode area fibers are photonic crystal fiber, low index step fiber, and gradient index fiber. The larger mode area of these fibers reduces the effects of fiber nonlinearities. Typically the mode areas are greater than 200 $\mu m^2$.

Laser: An acronym for light amplification by stimulated emission of radiation. A laser is a cavity that contains any material—crystal, glass, liquid, dye or gas—containing an atom that is capable of being excited to a metastable electronic state by a pumping energy e.g., by light or an electric discharge. The light emitted by the atom's electron as it returns to its energetic ground state is able to promote stimulated emission of other atoms in the medium. The light (referred to herein as stimulated radiation) is continually increased in intensity as it propagates through the gain medium.

Light: As used herein, the term light generally refers to electromagnetic radiation in a range of frequencies running from infrared through the ultraviolet, roughly corresponding to a range of wavelengths from about 100 nm to about 15 $\mu m$.

Nonlinear Optic: A class of optical phenomena that can typically be viewed only with nearly monochromatic, directional beams of light, such as those produced by a laser. Harmonic generation (e.g., second-, third-, and fourth-harmonic generation), optical parametric oscillation, sum-frequency generation, difference-frequency generation, optical parametric amplification, and the stimulated Raman effect are examples.

Nonlinear material: Materials that possess a non-zero nonlinear dielectric response to optical radiation that can give rise to nonlinear effects. Examples of nonlinear materials include crystals of lithium niobate ($LiNbO_3$), lithium triborate ($LiB_3O_5$ or LBO), beta-barium borate ($\beta$-$BaB_2O_4$ or BBO), cesium lithium borate ($CsLiB_6O_{10}$ or CLBO), as well as quasi-phase-matched materials.

Phase-matching: The technique used in a multi-wave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched.

Pulse width: Also known as pulse length, the time or duration of the pulse emitted by a pulsed laser. In some embodiments of the invention described herein, the pulse width is defined as the temporal duration that contains the majority of the pulse energy.

Repetition rate: The frequency of a running sequence of laser pulses, typically given in Hertz.

Waist: 1) The narrowest point of a nominally Gaussian beam; 2) The Gaussian beam radius at the narrowest point. The Gaussian beam radius is the radius at which the intensity of a nominally Gaussian beam is $1/e^2$ of the central, peak intensity.

An embodiment of the present invention provides a pulsed NIR fiber laser that uniquely emits coherent radiation with a combination of all the following properties: stable linear polarization, high peak power, pulse durations from 100 ps to 10 ns, narrow spectral bandwidth, and predominately one spatial mode. This fiber laser is of particular utility to frequency conversion and has many other applications including but not limited to remote sensing, range-finding, and LIDAR. This invention is applicable in the gain window of ytterbium-(Yb) doped fiber (1015-1085 nm, such as 1064 nm) or the gain window of erbium-(Er) doped fiber (1500-1575 nm, such as 1545 nm). An object of systems provided in accordance with embodiments described herein is to produce stable linearly polarized light pulses with a peak powers in the range of 10 kW to 500 kW, wavelength ranges of 1015-1085 nm or 1500-1575 nm (Yb- and Er-doped fiber, respectively), pulse widths that range from 100 ps to 10 ns, repetition rates that range from 1 kHz to 10 MHz, average powers that range 10-300 W, narrow spectral bandwidths$\leq$0.5 nm, and predominately a single spatial mode. The spectral width and temporal width of the emission are defined herein based on the power distribution within a predetermined portion of the pulse as opposed to the full-width-half-maximum to assure that the majority of the emission energy is within the spectral or temporal bandwidth. The working definition of a predominately single mode is a spatial distribution of light that can be focused down to a near diffraction limited spot with an $M^2<1.5$.

In some embodiments of the present invention temporal pulse widths and spectral bandwidths are used as a measure of temporal or spectral characteristics of the pulse based on energy in a predetermined portion of the pulse. For these characteristics, the majority of the pulse energy is contained in a predetermined portion of the pulse, for example, a majority of the energy is contained within the bandwidth of the pulse. This is in contrast to FHWM measures, in which a pulse can be characterized by a FWHM pulse width that includes only a small portion of the power in the pulse. An example would be a pulse with broad shoulders and a small temporal duration peak above the shoulders. If the amplitude of the peak is more than twice the amplitude of the shoulders, then the FWHM will be associated with the width of the peak, although only a small fraction of the total power is contained in the peak. Similar measures can be found in frequency space. The measurement used in embodiments herein more accurately measures the power characteristics of the pulse as a function of time Thus, embodiments of the present invention utilize temporal and spectral characteristics that are largely independent of long tails on a distribution, which can be a problem with FWHM measurements in which a majority of the power is present in the tails of the distribution. In a specific embodiment, the temporal pulse width is defined as the width that includes half the power in the pulse and the spectral bandwidth is defined as the bandwidth that includes half the power in the pulse.

The specifications of the subsystems that make up the fiber laser are chosen to maximize the peak power output while minimizing the nonlinear impairments and to keep the optical bandwidth (equal to the spectral width including half the power in a specific embodiment) below 0.5 nm. While fundamental equations have been established in the art for passive fiber use in laser systems, new models were developed by the inventors to optimize laser performance and select components necessary to achieve simultaneous high peak power, narrow spectral bandwidth, predominately one spatial mode, stable linear polarization, and pulse widths from 100 ps to 10 ns.

The design parameters for fiber laser provided by embodiments described herein are derived from a set of theoretical physical models of the devices that will be described below. Given the average output and input power of the amplifier and the peak output power these models predict the SBS generation of the amplifier, the SRS generation in the amplifier, and the SPM induced broadening of the output of the amplifier. The models are based on models developed to describe the nonlinearities in optical fiber communication, but have been uniquely modified to account for the different gain and passive fibers in a fiber laser system. We will focus below on one of the embodiments described in this specification: A 20 W average power and 40 kW peak power all-fiber laser with a pulse width of 1 ns and repetition rate of 0.5 MHz. While the preamplifier stages are modeled, the primary limitations in the laser performance come from the last stage, the power amplification stage. We show the modeling results for the power amplification stage and their implications on the amplifier design parameters. The goal of these models is to identify the operating regime of the fiber laser that has minimal nonlinear impairments. Further refinements could be made to maximize accuracy, but the general conclusions would not change.

SBS

SBS limits the output power of a fiber laser system and once a threshold peak power is reached, causes a high power backward-propagating beam in the laser system. This not only robs power from the output beam, but causes damage to preceding optical components in the system. The SBS threshold for a fiber system is defined below as the input optical peak power required, causing a backward propagating SBS beam equal to the input peak power. The following Agrawal equation predicts this for a length of passive fiber in a single polarization:

$$P_{th} = 21 A_e/(g_{sbs}L_e)[(\Delta v_b + \Delta v_p)/\Delta v_b],$$

where $A_e$ is the effective area of the fiber, $g_{sbs}$ is the material-dependent SBS gain, $L_e$ is the effective length of the fiber, $\Delta v_b$ is the SBS bandwidth (typically 50-100 MHz in silica fiber), and $\Delta v_p$ is the spectral bandwidth of the light propagating in the fiber. In the passive fiber case, $L_e$ is given by which $L_e \cong (e^{\alpha L-1})/\alpha$ where L is the length and $\alpha$ is the loss per unit length).

However, in a fiber amplifier there is both gain and passive delivery fiber. The passive delivery fiber has no appreciable loss per unit length in practical applications. Solving the equations for a fiber amplifier, the effective length is given as:

$$L_e = \int P(z) dz / P_{in}.$$

If we assume linear gain in the amplifier section and negligible loss in the delivery fiber the effective length is given by:

$$L_e \cong (e^{gL_g-1})/g + L_d P_{out}/P_{in} = L_g(G-1)/\ln(G) + L_d G,$$

where $L_g$ is the length of the gain section fiber, g is the net gain per unit length, $P_{in}$ is the input peak power, $P_{out}$ is the output peak power, $L_d$ is the delivery fiber length, and G is the single pass gain. The delivery fiber is the length of fiber after the gain fiber that is made up of the pump combiner and any other passive fiber that would serve as an output fiber or connect to an all-fiber collimator.

Figure 4:
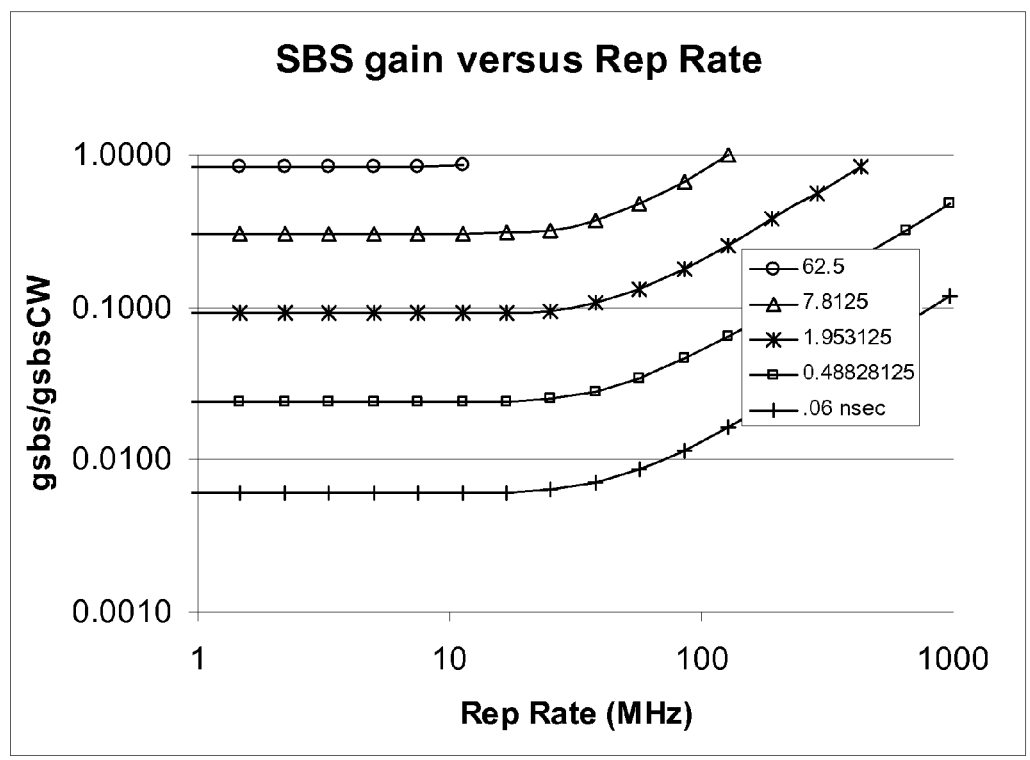
FIG. 4 shows the ratio of the SBS effective gain to the SBS gain in continuous wave operation versus pulse repetition rate for several different pulse widths according to an embodiment of the present invention.

This expression for effective length models quite accurately a counter-propagating pumped power amplifier, even though the gain is not linear. However, modeling the exact signal power exactly is given in the results described here. The effective length comes in as a parameter for all of the nonlinear impairments. Thus, one can draw some basic conclusions in order to decrease nonlinear impairments. The first is that delivery fiber length should be kept to a minimum since it dominates the effective length even at moderate gains. Secondly, gain length should be kept as small as possible. Given the definition of SBS threshold, the effective area of the fiber and the bandwidth of the signal should also be maximized given practical limitations. The above equation however does not take into account the time dependence of SBS. The acoustic grating formed within the fiber by the signal decays (and builds up) in ~10 ns. This result supports an effective SBS gain ($g_{sbs}$) that is dependent on pulse width and pulse repetition rate. FIG. 4 shows the ratio of the SBS effective gain to the SBS gain in continuous wave operation versus pulse width for several different pulse repetition rates according to an embodiment of the present invention. This data shown in FIG. 4 was generated by numerically solving for the time dependent SBS gain in the case of a periodic pulsed drive signal.

Figure 5:
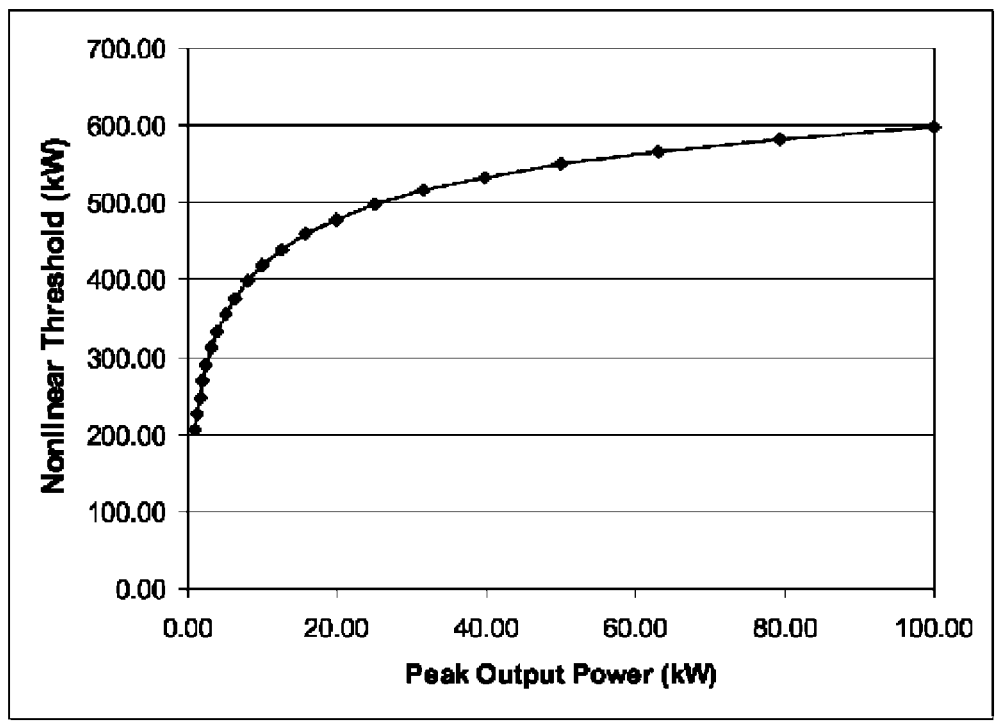
FIG. 5 illustrates the SBS nonlinear threshold versus output peak power for a fiber laser according to an embodiment of the present invention.

Referring to FIG. 4, it can be noted that the SBS gain decreases by over one order of magnitude for a pulse width of 1 ns and a repetition rate of 500 kHz. Including this effect and the natural bandwidth of the seed laser (30 pm) results in the graph of SBS threshold versus peak power illustrated in FIG. 5. FIG. 5 illustrates the SBS nonlinear threshold versus output peak power for a fiber laser according to an embodiment of the present invention.

Figure 6:
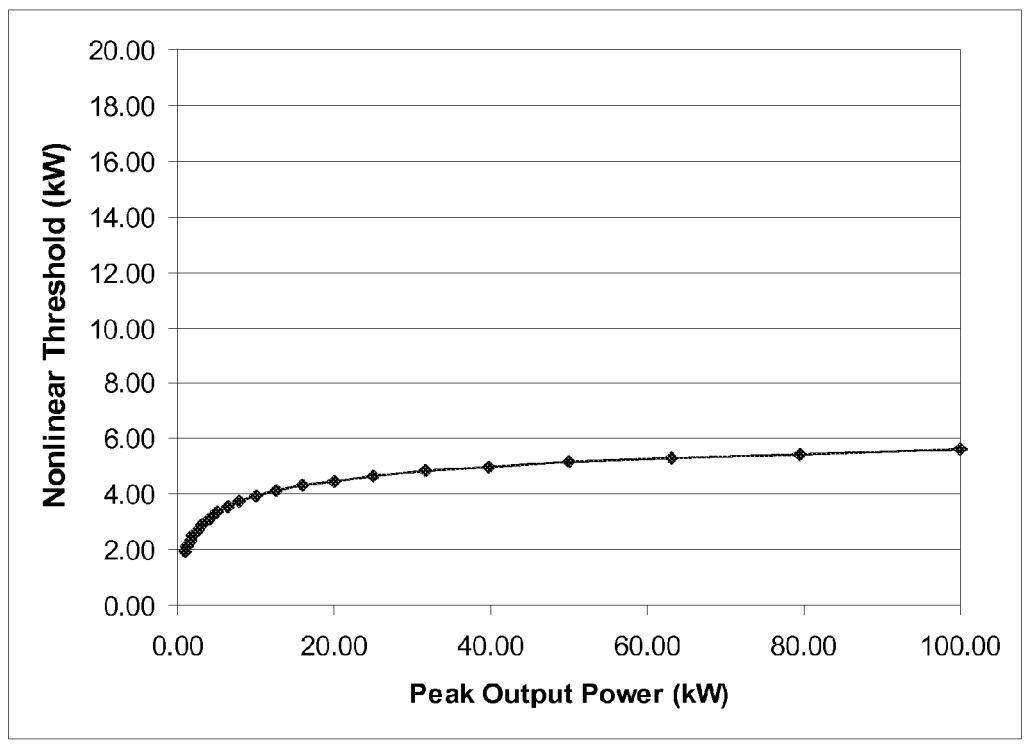
FIG. 6 shows the SBS threshold for the fiber laser with different pulse characteristics according to an embodiment of the present invention.

At an operating output peak power of 40 kW, the SBS threshold is greater than 500 kW. Thus SBS will not be observed in the defined operating regime of the laser. In order to demonstrate the importance of picking the correct operating regime the graph FIG. 6 shows the SBS threshold for the same amplifier described above, but with an input seed with 10 ns pulsewidth, 50 kHz repetition rate, and 2 pm bandwidth. In the example illustrated in FIG. 6, a different, non-optimal seed is utilized. Thus, the SBS threshold of less than 6 kW shown in FIG. 6 shows how important the seed operating parameters are to the overall performance of the fiber laser system. Using these longer pulses, the fiber amplifier would undergo significant degradation due to SBS with peak output powers as low as 5 kW.

SRS

The threshold peak input power for the onset of SRS can similarly be derived for the fiber amplifier as:

$$P_{srs}=16A_e/g_{srs}L_e,$$

where the same definitions for effective mode area and effective length as before are used, and $g_{srs}$ is the SRS gain coefficient (approximately equal to $10^{-13}$ m/W at a wavelength of 1064 nm). Note that there is no SRS bandwidth term in the above equation. This is because SRS has a very fast decay time (~50 fs) and thereby follows the electric field fluctuations.

Figure 7:
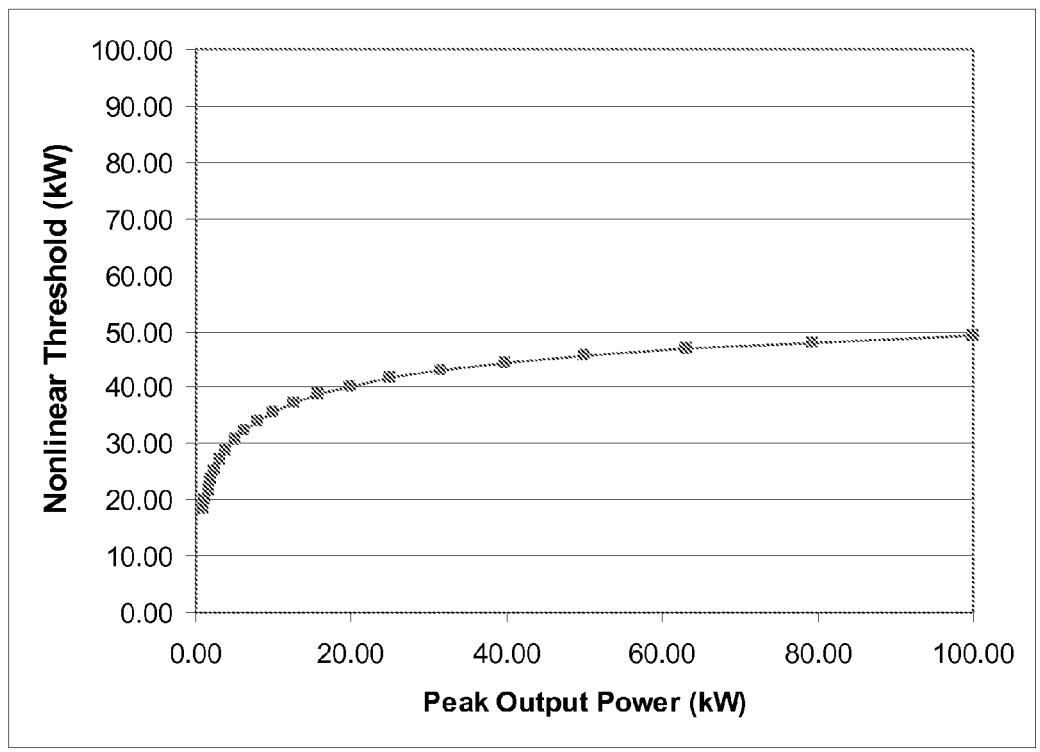
FIG. 7 shows the SRS nonlinear threshold versus peak output power for the fiber laser according to an embodiment of the present invention.

FIG. 7 shows the SRS nonlinear threshold versus peak output power for the fiber laser according to an embodiment of the present invention. The SRS threshold is somewhat greater than 40 kW at an operating output peak power of 40 kW. Thus, the output emission will not be degraded by SRS.

Figure 8:
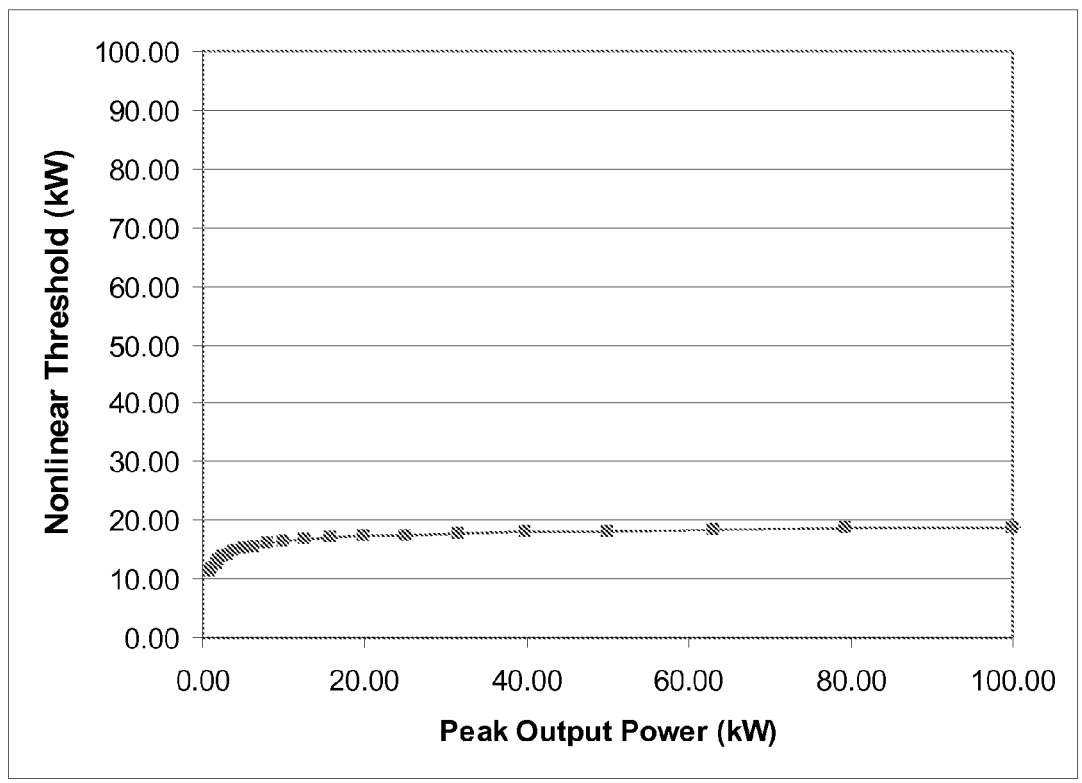
FIG. 8 shows the SRS threshold versus peak power for an amplifier according to an embodiment of the present invention using a delivery fiber length of 2 m.

To illustrate the importance of delivery fiber length, FIG. 8 shows the SRS threshold versus peak power for the same amplifier described above, but with a delivery fiber length increased from 0.5 m to 2 m. The peak output power is limited to less than 20 kW in this case.

SPM

SPM results in a broadening of the spectrum of a signal propagating in an optical fiber. The resulting spectral width $\Delta\lambda$ can be approximated for a Gaussian pulse as:

$$\Delta\lambda/\Delta\lambda_0=\sqrt{1+4/(3\sqrt{3})(n_2kP_{in}L_e/A_e)^2},$$

where $\Delta\lambda_0$ is the initial spectral linewidth, k is the wavevector in free-space, $P_{in}$ is the input peak power, $n_2$ is the nonlinear index of refraction (~$2.3\times10^{-16}$ cm$^2$/W at 1064 nm), and $L_e$ and $A_e$ have the same definitions as before.

Figure 9:
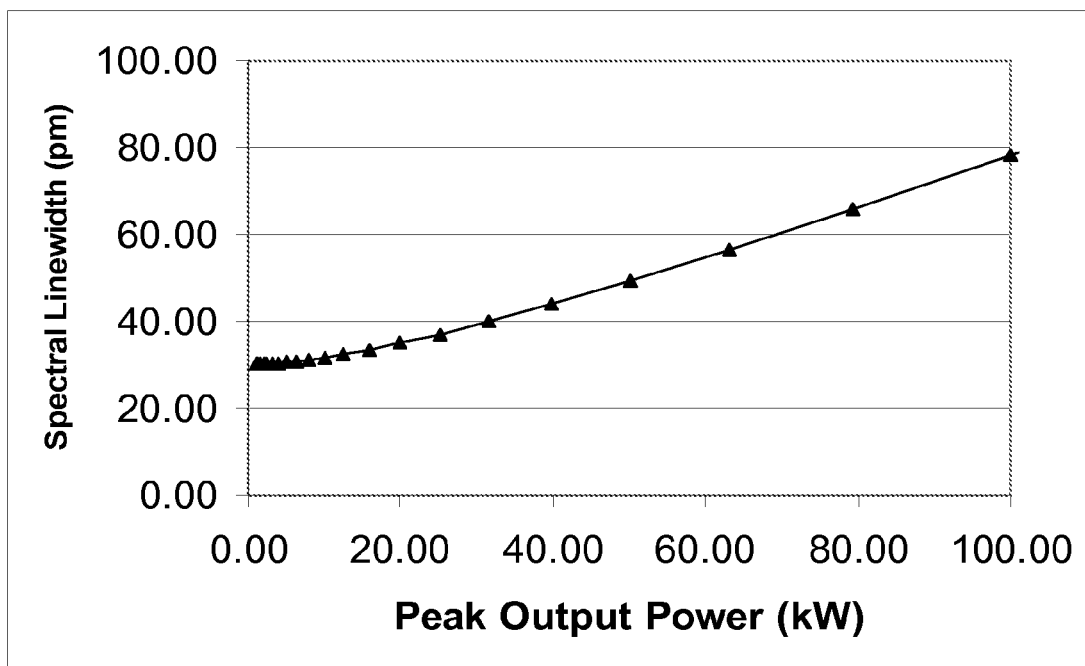
FIG. 9 shows the spectral linewidth versus peak power for a fiber laser according to an embodiment of the present invention.

FIG. 9 shows the spectral linewidth versus peak power for a fiber laser according to an embodiment of the present invention. As shown in FIG. 9, one can see that at 40 kW peak output power, the spectrum is only slightly broadened to ~45 pm. This is due to the large mode area, short effective length, and input pulse characteristics in the fiber laser.

Figure 10:
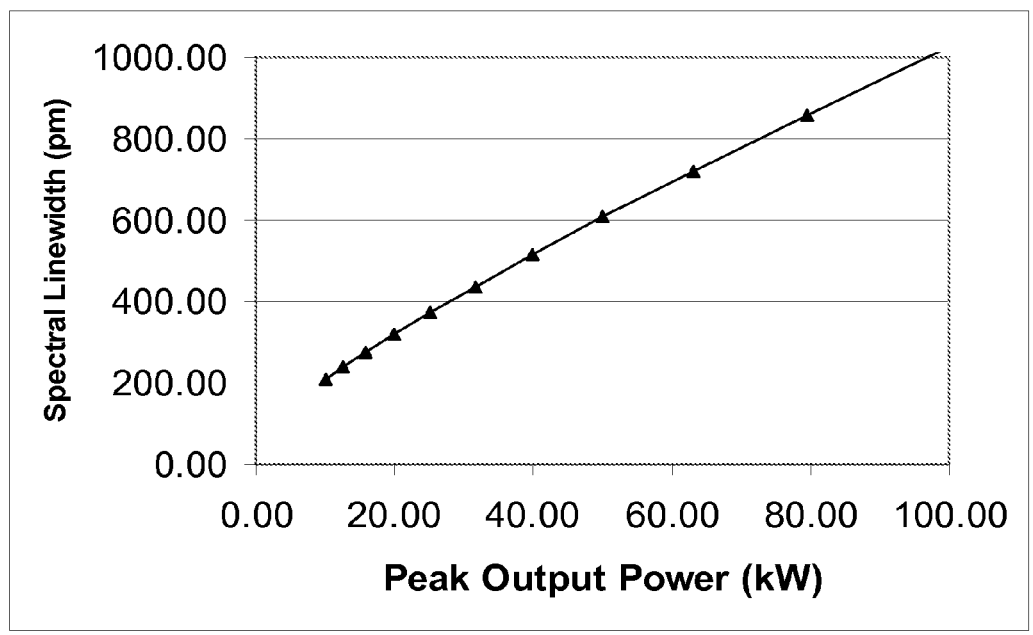
FIG. 10 shows the spectral linewidth versus peak output power for a fiber laser according to an embodiment of the present invention with an input pulse duration of 100 ps.

FIG. 10 shows the spectral linewidth versus peak output power for a fiber laser according to an embodiment of the present invention with an input pulse duration of 100 ps. FIG. 10 illustrates the importance of input pulse temporal duration on the SPM induced spectral broadening. By changing the input pulse duration to 100 ps, the spectral linewidth increases to greater than 500 pm at an output peak power of 40 kW.

The modeling results presented above were performed for ytterbium fiber systems, however, similar models suitable for erbium fiber systems operating at 1500-1575 nm are included within the scope of embodiments of the present invention. Therefore, additional rare earth active elements are utilized in alternative embodiments as appropriate to the particular application. One of ordinary skill in the art would recognize many variations, modifications, and alternatives.

In an embodiment, the fiber laser system is constructed by using a master oscillator and fiber amplifier architecture. The master oscillator is the laser source that emits the seed radiation that is amplified by the fiber amplifier. The emission output is a series of laser energy pulses with a peak-to-valley contrast power ratio of greater than 40 dB in order to assure that >90% of the energy in the emission is contained within the pulses. The fiber laser emission wavelength, temporal pulse shape, and repetition frequency are determined by the master oscillator. The master oscillator emits radiation in predominantly a single spatial mode with a stable linear polarization. The spectral bandwidth of the master oscillator emission is less than 0.5 nm, but greater than 10 pm in order to minimize SBS in the amplifier subsystem. To further suppress SBS in the amplifier subsystem, the temporal width of the master oscillator emission is approximately between 10 ns and 100 ps, and the repetition rate is less than 10 MHz.

While a preferred embodiment herein describes a 1064 nm wavelength, frequency-stabilized diode laser as the master oscillator, other lasers systems may be used including, but not limited to, diode pumped solid state laser oscillators, fiber laser oscillators, diode lasers operating at other wavelengths within the Yb or Er gain spectra, or the like. The master oscillator may include a low power fiber amplifier to increase the power of the master oscillator emission.

The emission from the master oscillator then propagates, either via free-space optics or optical fiber, through an apparatus for optical isolation in order to protect the master oscillator from backward-propagating emission from the fiber amplifier.

After passing through an optical isolator, the master oscillator emission is amplified by the fiber amplifier subsystem. The fiber amplifier subsystem consists of one or more fiber amplifier gain stages pumped by one or more diode lasers for each stage. In an embodiment, a fiber gain stage includes a length of Yb- or Er-doped fiber, one or more pump laser diodes (typically based on AlGaAs/GaAs designs), and a means of coupling the emission of the pump laser diodes into the doped gain fiber as well as coupling the master oscillator emission into the core of the gain fiber. The amplifier stages may be considered either a preamplifier or power amplifier stage.

A preamplifier stage provides high gain, relatively low output power, while the power amplifier operates with lower gain, but delivers high output power, and generally operates in a saturated gain regime. The preamplifier precedes the power amplifier in a fiber amplifier system. The power amplifier is back-pumped in some embodiments, i.e., the pump laser diode emission propagates towards the master oscillator. Forward pumping alone increases the fiber nonlinear impairments and is not generally desirable in the power amplifier stage. In the case of more than one gain stage, each gain stage is separated from the preceding gain stage by an optical isolator in order to protect the previous gain stage from damage and prevent the buildup of backward propagating amplified spontaneous emission. The gain fiber is polarization-maintaining and may be single-clad or double-clad fiber. The power amplifier stage of the fiber amplifier system is specified in a specific embodiment to use double-clad, large mode area (LMA) gain fiber in order to decrease SBS, SRS, SPM, and other non-linear effects. In the case of an Yb-doped power amplifier gain stage, the fiber length is kept to a minimum (e.g., <5 m) and optically pumped by laser diodes with output radiation that is wavelength-controlled to 976 nm. Similarly, an Er-doped power amplifier gain stage will use a fiber length that is kept to a minimum and optically pumped by laser diodes of about 980 nm in wavelength.

The LMA power amplifier gain fiber may not be a strictly single spatial mode fiber: several higher order optical modes may be guided by the fiber. One method to suppress the amplification of higher order spatial modes in the power amplifier is to wrap the power amplifier gain fiber around a support member, for example, a spool of a selected radius. The higher order spatial modes have a much greater bending loss than the desired lowest order optical spatial mode in the spooled LMA fiber. The support member (e.g., spool) may be temperature-controlled in order to dissipate heat generated in the gain fiber or to provide a predetermined temperature gradient along the length of the gain fiber in order to reduce SBS or other non-linear effects. Another method of higher order spatial mode suppression is to use a chiral gain fiber where the undesired modes are coupled out of the main gain fiber by secondary optical pathways. An example of a chiral fiber laser apparatus is provided in U.S. Pat. No. 6,671,293.

The output of the amplifier may then enter a delivery fiber that routes the light to the application. If a delivery fiber is used, a passive fiber (i.e., no dopants) is employed that is generally polarization-maintaining LMA fiber with a short length, e.g., less than 3 m. In a specific embodiment, the length of the delivery fiber is less than 2 m, less than 1 m, equal to about 0.5 m, or less than 0.5 m. The short length and large mode area decreases nonlinear impairments.

Embodiments of the present invention as described herein have the capability to increase average output power without increasing nonlinear fiber impairments caused by higher peak power. The average output power may be increased by increasing the pulse repetition rate of the master oscillator and by coupling more diode pump laser power to the power amplifier stage of the fiber amplifier. When the amount of pump power in the power amplifier stage is doubled and the master oscillator repetition rate is doubled, then the average output power is doubled while the peak power remains approximately the same. With this method, average powers in excess of 1 kW may be obtained (generally set by the optical damage of components and fiber) without the peak power of the fiber laser increasing to a point that fiber nonlinearities de-rate the desired emission characteristics.

Similarly, the pulse width may be altered without changing the average power. By changing the pulse width of the master oscillator emission while adjusting the repetition rate of the master oscillator to maintain constant master oscillator average output power, the pulse duration may be varied without significantly changing the average power. Also, peak power can be modified as the repetition rate is changed without altering the average power due to the saturation of the power amplifier stage. The agile nature of the fiber laser emission operational parameters as described by the invention herein is unique among high power laser systems.

A first embodiment of the present invention is described below and has emission output parameters as listed in Table 1. In a second embodiment, the average power is 20 W, the peak power is 40 kW, and the output spectral bandwidth is 45 pm.

TABLE 1

Fiber laser output parameters of a first embodiment.

| | |
|---|---|
| Wavelength | 1064 nm |
| Bandwidth | 35 pm |
| Pulse Duration | 2 ns |
| Average Power | 20 W |
| Peak Power | 20 kW |
| Pulse Energy | 100 µJ |
| Output Beam Spatial Profile | Predominately single mode, $M^2 < 1.3$ |
| Polarization | Linear, 20:1 |
| Repetition Rate | 500 kHz |

Figure 2:
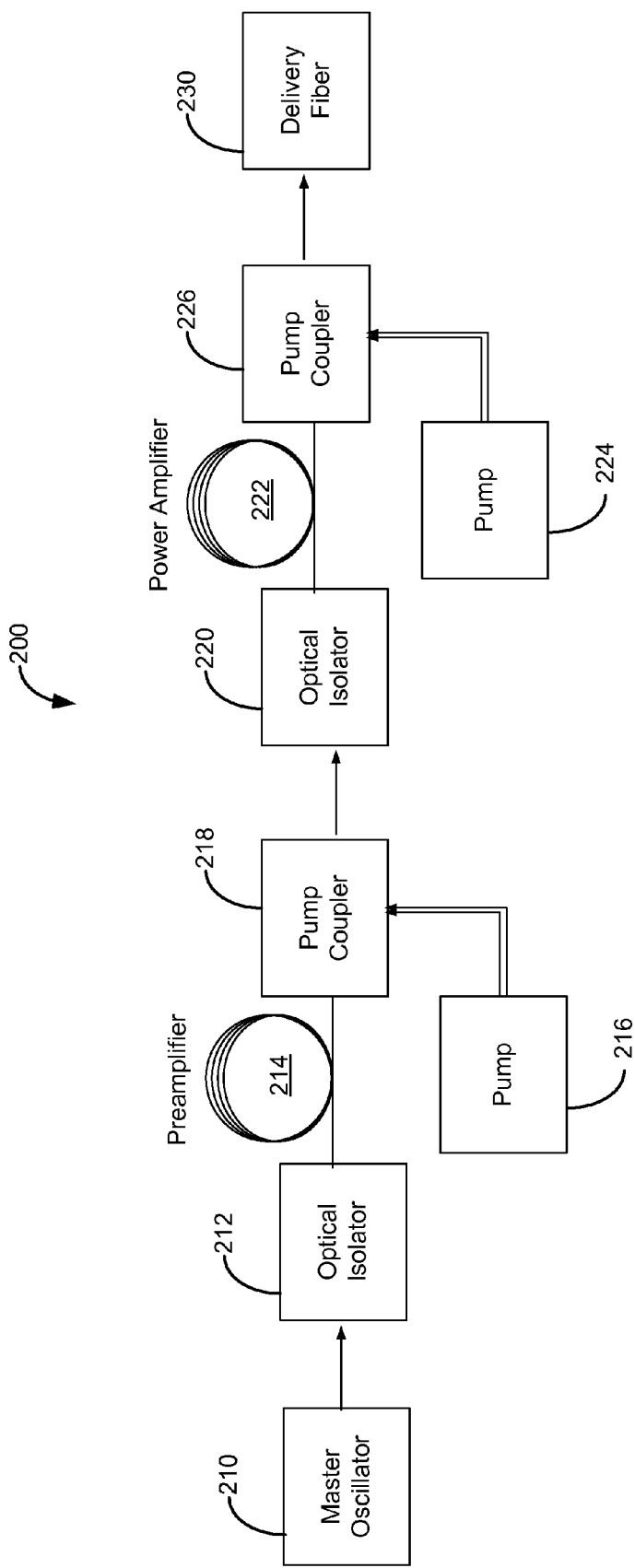
FIG. 2 is a schematic diagram of a fiber laser according to an embodiment of the present invention.

FIG. 2 is a schematic diagram of a fiber laser according to the first embodiment of the present invention with parameters listed in Table 1. The fiber laser has a MOFA architecture with a preamplifier and power amplifier included in the fiber laser system 200. The Master Oscillator 210 may be a diode laser that is frequency locked by a fiber Bragg grating in order to provide an optical bandwidth less than 30 pm in pulsed operation. Typically, the diode laser is pulsed by a pulsed current source with adjustable current pulse width, amplitude, and repetition rate. The output of the Master Oscillator 210 is fiber coupled into a single spatial mode, 6 µm core, polarization-maintaining fiber and has emission characteristics as listed in Table 2.

TABLE 2

Emission characteristics of master oscillator

| | |
|---|---|
| Wavelength | 1064 nm |
| Bandwidth | 30 pm |
| Pulse Duration | 2 ns |
| Average Power | 5 mW |
| Peak Power | 50 W |
| Pulse Energy | 50 nJ |
| Output Beam Spatial Profile | Single Mode, $M^2 < 1.1$ |
| Repetition Rate | 500 kHz |
| Polarization | Linear, 40:1 |

The emission from the Master Oscillator 210 propagates through a fiber-coupled optical isolator 212 that has an optical isolation of greater than 25 dB. The emission then propagates via fiber to the first stage of the fiber amplifier. The first stage of the fiber amplifier includes a gain fiber 214, a pump coupler 218, and a diode laser pump 216. In an embodiment, the gain fiber is an Yb-doped, 6 µm core, polarization-maintaining fiber of length 3 m. The gain fiber 214 is pumped by a 1 W average power, continuous wave 976 nm wavelength diode laser through the pump coupler 218. The 976 nm pump laser is wavelength controlled, either by temperature or wavelength locking device, to an accuracy of ±0.5 nm. The pump coupler 218 is a wavelength division multiplexing (WDM) device that couples the 976 nm pump light into the core of the gain fiber 214. In a specific embodiment, the first amplifier stage has an unsaturated gain of 28 dB and amplifies the signal to an average output power of 0.5 W.

Referring to FIG. 2, one or more of pump couplers 218 and 226 are fiber pump couplers in an embodiment and do not include any free space coupling elements. Thus, some embodiments utilize a monolithic fiber laser design (i.e., no free-space coupling elements in the laser design). The inventors have determined that the use of free-space couplers in some fiber laser designs, for example, using a dichroic mirror and a lens that couples the pump light into the outer cladding of a double-clad fiber amplifier, limits the system robustness as compared to a monolithic fiber design. Thus, some designs described herein are substantially free of free-space optical couplers. Additionally, some conventional systems utilizing free-space optical couplers do not include a delivery fiber, which is illustrated in FIG. 2. Thus, in these conventional systems, although some power levels are achievable, such systems are not robust due to mechanical stability requirements that are on the order of microns.

The output of the first gain stage then passes through a fiber-coupled isolator 220 with isolation greater than 25 dB. The input fiber to the isolator 220 is 6 µm core, single mode, polarization-maintaining fiber. The output of the isolator is a 25 µm core diameter, few spatial mode, polarization-maintaining fiber. Other means known in the art including but not limited to tapered splices or mode field adapting optics may be used after the optical isolator 220 in order to adapt between the differing fiber core diameters. The coupling means does not necessarily have to predominately couple the energy into the fundamental mode of the large mode area fiber. A coiling of the fiber will attenuate the higher order modes relative to the fundamental mode of the gain fiber.

The emission from the optical isolator 220 propagates via fiber to the second stage of the fiber amplifier. The second stage of the fiber amplifier includes a gain fiber 222, a pump coupler 226, and diode laser pumps 224. In an embodiment, the gain fiber is an Yb-doped, double-clad, polarization-maintaining fiber of length 3 m. The gain fiber has a core diameter of 25 μm, a first cladding diameter of 250 μm, and a second cladding diameter of 400 μm. The gain fiber is wrapped around an 8 cm diameter temperature-controlled spool. The gain fiber is pumped by a total of 36 W average optical power sourced from 6 continuous wave 976 nm wavelength diode lasers 224 through the pump coupler 226. The 976 nm pump lasers are wavelength controlled, either by temperature or passive wavelength locking device, to an accuracy of ±0.5 nm and emit 6 W of continuous output power each.

In a particular embodiment, the pump coupler 226 combines the light from six 976 nm pump lasers into the cladding of the gain fiber 222. The pump coupler 226 used in this embodiment is a {6×1×1} star coupler that couples the light from six multimode 200 μm core diameter fibers into the cladding of the gain fiber 222. The pump coupler 226 may be similar in design to that described in U.S. Pat. No. 6,434,302. Other of the various means known in the art to couple multiple pumps into a double clad gain fiber may also be used. The second amplifier stage has an unsaturated gain of 20 dB and amplifies the signal to an average output power of 20 W. The output of the amplifier then propagates through a 25 μm core passive (no dopants) delivery fiber 230 0.5 m in length out of the fiber laser system.

It should be noted that the spectral bandwidth of the output emission (35 pm) is larger than the spectral bandwidth of the master oscillator emission (30 pm). This is due to the spectral broadening induced by SPM. The lengths of the fibers in the system are chosen such that SPM does not increase the spectral bandwidth beyond 35 pm in this embodiment.

In a second embodiment, the fiber laser described above is modified so as to emit 40 kW of peak power while having the same average power. The master oscillator 210 diode drive current pulse is changed such that the master oscillator emits optical pulses with temporal width of 1 ns. The master oscillator emission is amplified to 20 W average power and 40 kW peak power. The other emission characteristics remain unchanged from the first embodiment with the exception of additional spectral bandwidth broadening in the output emission of spectral bandwidth 300 pm.

In a third embodiment, the fiber laser described in the first embodiment is modified so as to emit 40 W of average power while having the same peak power. The master oscillator 210 diode drive current pulse is changed such that the master oscillator emits optical pulses at a repetition frequency of 1 MHz and temporal width of 2 ns. The pump coupler 226 of the power amplifier stage is changed to a {1×1×1} coupler that couples the 976 nm emission from a single pump laser that emits 72 W of average power delivered through a 200 μm core diameter multimode fiber into the cladding of the gain fiber 222. The output emission of the saturated power amplifier has a 40 W average power and a peak power of 20 kW. The other output emission specifications are approximately the same as described in the first embodiment.

Figure 3:
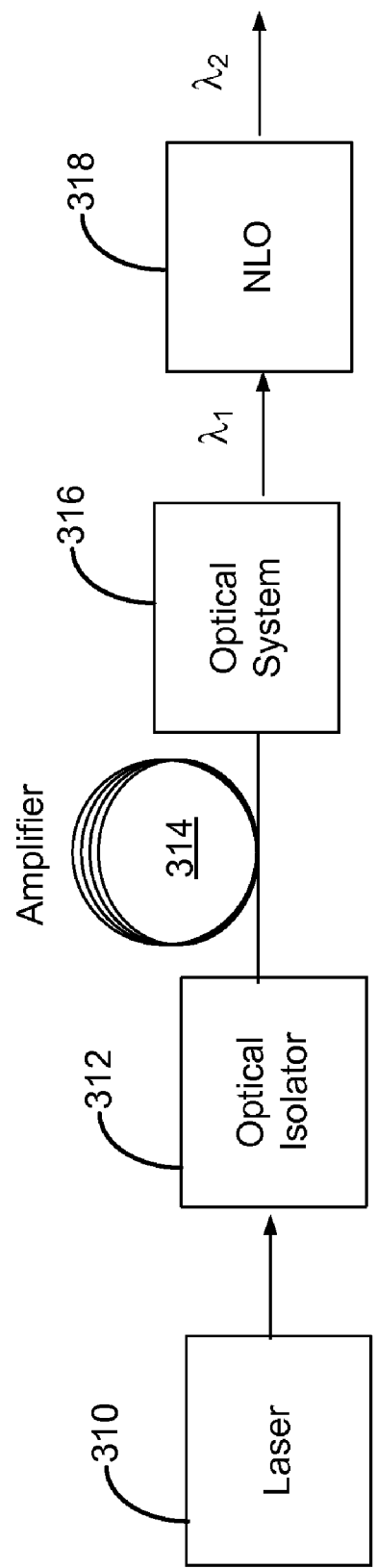
FIG. 3 is a simplified schematic diagram of a frequency conversion system including a fiber laser system according to an embodiment of the present invention.

FIG. 3 is a simplified schematic diagram of a frequency conversion system including a fiber laser system according to an embodiment of the present invention. The frequency conversion system includes a laser 310, an optical isolator 312, and an amplifier 314. Descriptions provided in relation to FIG. 2 are applicable to system elements illustrated in FIG. 3, including the laser 310, the optical isolator 312, and the amplifier. In a particular embodiment, the laser is a 1064 nm fiber laser characterized by a 20 W average power pulse train of peak power 40 kW. For example, the optical isolator 312 may share one or more common features with optical isolator 212 described in relation to FIG. 2. Thus, the various components illustrated in FIG. 3 can share one or more common elements or features with other similar components described throughout the specification. One of ordinary skill in the art would recognize many variations, modifications, and alternatives.

The frequency conversion system also includes an optical system 316 that is configured to deliver light from the amplifier 314 to one or more nonlinear optical elements (NLO) 318. The optical system may include one or more lenses, apertures, fiber couplers, or the like. Light delivered to the one or more NLO elements 318 is characterized by a first input wavelength and frequency conversion inside the one or more NLO elements results in production of light of a second wavelength. In a frequency doubling application, the second wavelength is equal to half of the input wavelength. As will be evident to one of skill in the art, the light emitted by the amplifier 312 will be characterized by a predetermined spectral bandwidth, thus, the references to wavelengths of $\lambda_1$ and $\lambda_2$ (which may be equal to $\lambda_1/2$ in a frequency doubling application) may be understood to refer to wavelengths within the predetermined spectral bandwidth.

In a particular embodiment of the present invention, the one or more NLO elements or conversion stage 318 includes a number of sub-elements including input and output coupling optics that form an 80 μm waist ($1/e^2$ radius) in the middle of a temperature controlled non-critically phase-matched lithium triborate (LBO) crystal of length 20 mm, and dichroic filters that separate the 532 nm light from the residual 1064 nm light. The one or more NLO elements in this particular embodiment also includes a plurality of frequency conversion stages that convert the light from a first frequency to a second frequency in a first stage and from the second frequency to a third frequency in a second stage. Thus, a first frequency conversion stage (the LBO crystal described above converting about 50% of the 1064 nm light to 532 nm light) is used to feed a second frequency conversion stage that converts a predetermined percentage (e.g., about 10%) of the light at the second frequency (e.g., 532 nm light) into 266 nm light. The second frequency conversion stage may contain input and output coupling optics that form a 14 μm waist in the middle of, a 2 mm long yttrium lanthanum aluminum borate NLO crystal, and dichroic filters that separate the 266 nm light from the residual 532 nm light. The final output of the laser system in this embodiment is a 2.0 W average power pulse train of 266 nm light. In some frequency conversion systems with multiple frequency conversion crystals, the second crystal can be a rare earth aluminum huntite crystal, for example, an yttrium lanthanum aluminum borate crystal, an yttrium lutetium aluminum borate crystal, a lanthanum lutetium aluminum borate crystal, an yttrium aluminum borate crystal, or the like. One of ordinary skill in the art would recognize many variations, modifications, and alternatives.

Although FIG. 3 has been described in the context of a frequency doubling application, embodiments of the present invention provide for other frequency conversion applications including frequency tripling, and the like. In additional embodiments, OPO designs, OPA designs, and the like are provided by the use of the laser devices described herein optically coupled to one or more nonlinear optical elements. In other embodiments, the components described herein are ideal for integration into a shorter wavelength frequency conversion laser systems. The applications for these laser systems include micromachining, imaging, communication, and others.

The foregoing description of embodiments of the present invention has been presented for purposes of illustration and description. Similar systems are provided by other embodiments at other wavelengths such as 1550 nm for an Er-doped fiber system or an Er/Yb-codoped fiber system. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as a suited to the particular use contemplated.

Figure 11:
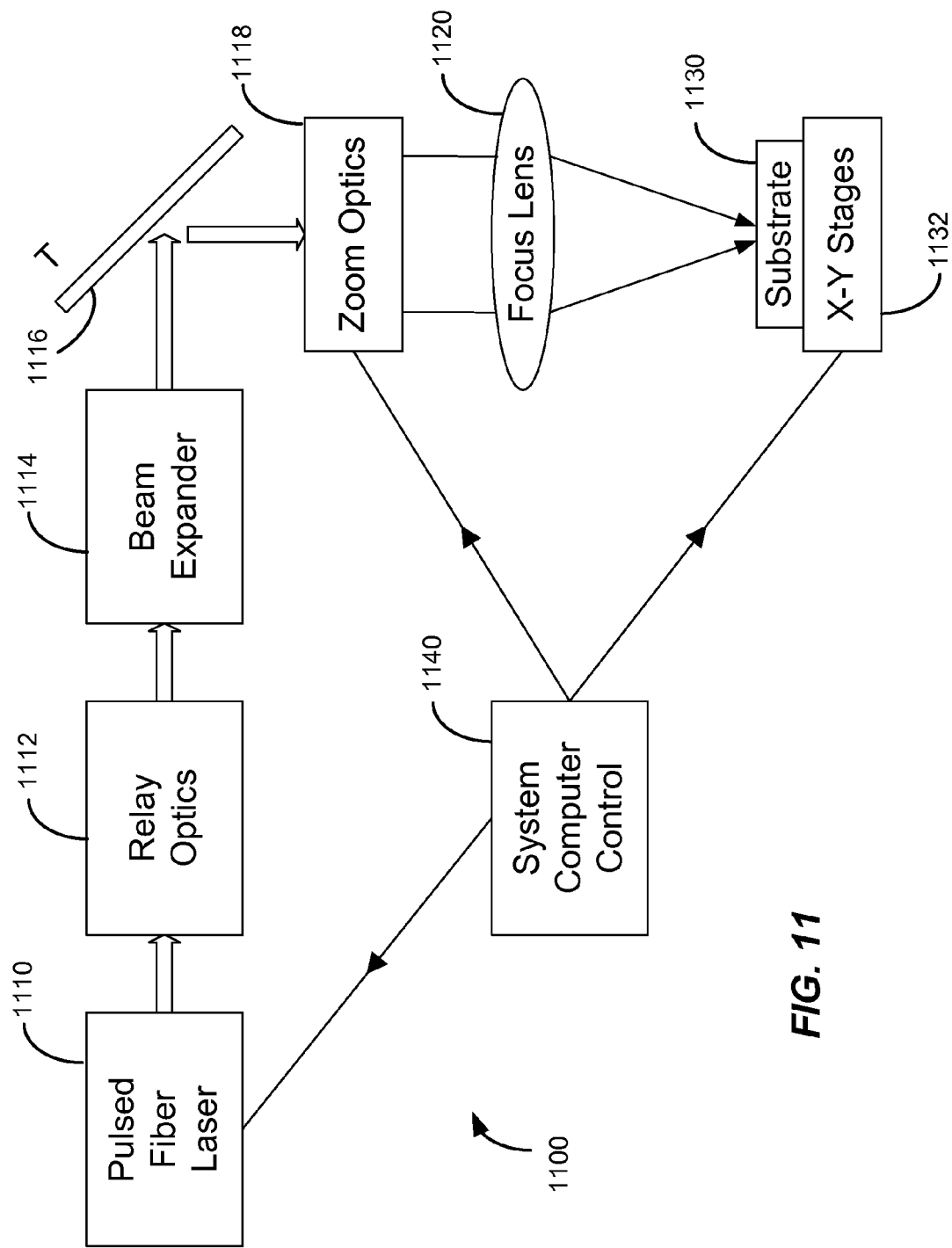
FIG. 11 is a simplified schematic diagram illustrating a micromachining system according to an embodiment of the present invention.

FIG. 11 is a simplified schematic diagram illustrating a micromachining system according to an embodiment of the present invention. As shown in FIG. 11, the micromachining system 1100 includes a pulsed fiber laser 1110. Pulsed fiber lasers as described throughout the present specification are suitable for use in the micromachining system. Relay optics 1112 deliver the output of the pulsed fiber laser 1110 to a beam expander 1114, which expands the beam dimension as a function of propagation distance. The turning mirror 1116 directs the optical beam toward zoom optics 1118 and focus lens 1120. Although only two optical elements are illustrated as the zoom optics and the focus lens, one of skill in the art will appreciate that additional optical elements may be utilized depending on the particular optical design. The laser light is focused onto a substrate 1130 that is supported on X-Y stages 1132. One or more elements of the micromachining system 1100 are under control of system computer control 1140, which communicates in a one way or two way manner with the various system components. Embodiments of the present invention include SHG, 4HG, or 8HG wavelengths for micromachining applications. The pulsed fiber laser systems 1110 in these embodiments may include one or more nonlinear frequency conversion elements that provide an output at a predetermined wavelength (e.g., a frequency quadrupled wavelength of 266 nm) for these micromachining applications.

Figure 12:
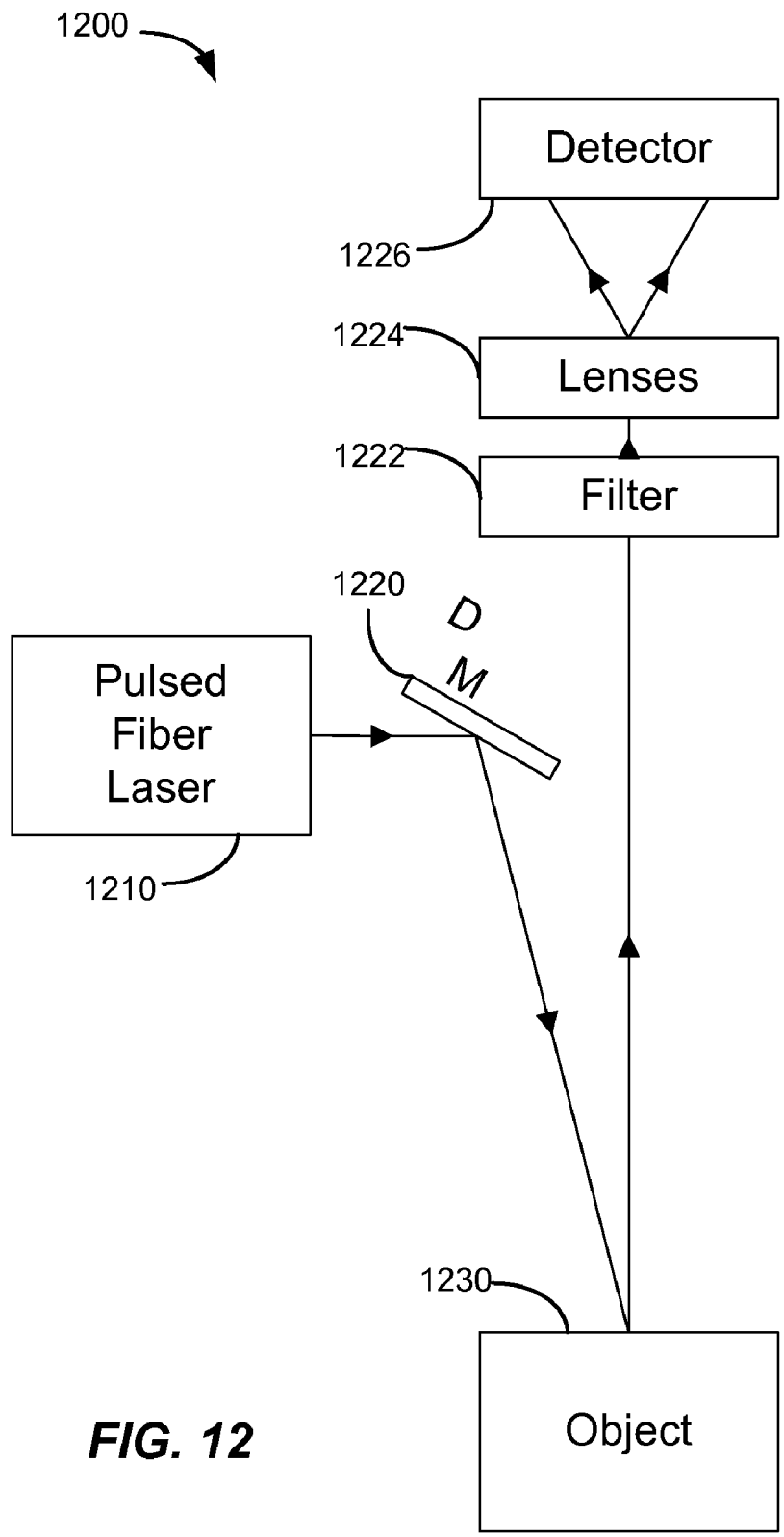
FIG. 12 is a simplified schematic diagram illustrating a LIDAR system according to an embodiment of the present invention.

FIG. 12 is a simplified schematic diagram illustrating a LIDAR system according to an embodiment of the present invention. As illustrated in FIG. 12, the LIDAR system 1200 includes a pulsed fiber laser 1210. Pulsed fiber lasers as described throughout the present specification are suitable for use in the LIDAR system. Laser light from the pulsed fiber laser is directed to an object 1230 of either close proximity or at some remote distance away using the directing mirror 1220, which is typically mounted on a moveable structure. Thus, the directing mirror is able to scan the laser beam over the object in some embodiments. Light reflected from the object 1230 passes through filter 1222 and lenses 1224 to impinge on detector 1226. Although a single filter and set of lenses are illustrated in FIG. 12, one of skill in the art will appreciate that other optical systems suitable for LIDAR applications are included within the scope of embodiments of the present invention. Embodiments of the present invention include SHG, 4HG, and 8HG wavelengths for LIDAR applications. The pulsed fiber laser systems 1210 in these embodiments may include one or more nonlinear frequency conversion elements that provide an output at a predetermined wavelength (e.g., a frequency quadrupled wavelength of 266 nm) for these LIDAR applications.

Thus, while only certain embodiments of the invention have been specifically described herein, it will be apparent that numerous modifications may be made thereto without departing from the spirit and scope of the invention. Further, any acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A fiber laser system capable of simultaneously generating linearly-polarized laser radiation with peak powers from 10 kW to 500 kW, wavelengths of 1015-1085 nm, pulses with durations of 100 ps to 10 ns, pulse train repetition rates of 1 kHz to 10 MHz, average powers of 10-300 W, spectral bandwidth less than 0.5 nm, and a predominately single spatial mode, the fiber laser system comprising:
    a master oscillator configured to generate linear polarized infrared laser radiation with wavelengths of 1015-1085 nm, pulses with durations of 100 ps to 10 ns, pulse train repetition rates of 1 kHz to 10 MHz, spectral bandwidth less than 0.5 nm, and a predominately single spatial mode;
    a polarization-maintaining optical isolator optically coupled to the master oscillator; and
    a fiber amplifier system optically coupled to the optical isolator and including a power amplifier configured to amplify the linear polarized infrared laser radiation transmitted through the optical isolator, the power amplifier comprising:
        a polarization-maintaining, large-mode-area, multiple-clad Yb-doped gain fiber having a core, an inner cladding, and at least an outer cladding;
        one or more diode pump lasers emitting pump light of nominal wavelength of 976 nm; and
        a pump coupler configured to couple the pump light into the inner cladding of the gain fiber.

2. The fiber laser system of claim 1 wherein the optical isolator is configured to attenuate light propagating from the fiber amplifier system to the master oscillator while transmitting at least a portion of light propagating from the master oscillator to the fiber amplifier system.

3. The fiber laser system of claim 1 wherein the fiber amplifier systems further comprises one or more preamplifier stages preceding the power amplifier, wherein each of the one or more preamplifier stages comprises:
    a polarization-maintaining doped gain fiber having a core and at least a first cladding;
    one or more pumps providing pump power; and
    a pump coupler configured to optically couple the pump power into at least the core or the first cladding of the gain fiber.

4. The fiber laser system of claim 3 further comprising an optical isolator between each of the one or more preamplifier stages and an optical isolator between one of the one or more preamplifier stages and the power amplifier.

5. The fiber laser system of claim 1 wherein the diode pump lasers comprise one or more laser diode bar arrays.

6. The fiber laser system of claim 1 wherein the diode pump lasers comprise one or more single emitter laser diodes.

7. The fiber laser system of claim 1 wherein the master oscillator comprises a frequency-controlled diode laser pumped by an electric current pulse.

8. The fiber laser system of claim 1 wherein the master oscillator comprises a frequency-controlled CW diode laser coupled to an external electro-optic modulator.

9. The fiber laser system of claim 1 wherein the master oscillator comprises a diode-pumped solid-state laser.

10. The fiber laser system of claim 1 further comprising a large mode area polarization delivery fiber of length less than or equal to 5 m configured to guide the emission from the power amplifier to an application point.

11. The fiber laser system of claim 1 further comprising a temperature-controlled support member for the gain fiber, wherein a predetermined temperature gradient is provided along a length of the gain fiber.

12. The fiber laser system of claim 1 further comprising a controller configured to adjust at least one of a temporal pulse width and a repetition rate of the linear polarized infrared laser radiation generated by the master oscillator.

13. The fiber laser system of claim 1 wherein the pump coupler for the power amplifier is an {n×1×1} fused star coupler, with n being an integer greater than or equal to one.

14. The fiber laser system of claim 1 wherein the pump coupler comprises an all fiber cladding coupler.

15. A frequency conversion system comprising: a master oscillator configured to generate linear polarized infrared laser radiation with pulses with durations of 100 ps to 10 ns, pulse train repetition rates of 1 kHz to 10 MHz, spectral bandwidth less than 0.5 nm, and a predominately single spatial mode; a polarization-maintaining optical isolator optically coupled to the master oscillator; a fiber amplifier system optically coupled to the optical isolator and including a power amplifier configured to amplify the linear polarized infrared laser radiation transmitted through the optical isolator; an optical system optically coupled to the fiber amplifier system; and a nonlinear optical element configured to receive the amplified linear polarized infrared laser radiation from the fiber amplifier system and output frequency converted radiation; wherein the power amplifier comprises: a polarization-maintaining, large-mode-area, multiple-clad Yb-doped gain fiber having a core, an inner cladding, and at least an outer cladding; one or more diode pump lasers emitting pump light of nominal wavelength of 976 nm, and a pump coupler configured to couple the pump light into the inner cladding of the gain fiber.

16. The frequency conversion system of claim 15 wherein the optical isolator is optically coupled to the master oscillator using a fiber coupler and the pump coupler comprise an all fiber cladding coupler.

17. The frequency conversion system of claim 15 wherein a wavelength of the frequency converted radiation is 507-543 nm or 254-271 nm.

18. The frequency conversion system of claim 15 wherein a wavelength of the frequency converted radiation is 750-788 nm, 375-394 nm, or 188-197 nm.

19. The frequency conversion system of claim 15 wherein the nonlinear optical element comprises a set of frequency doubling crystals.

20. The frequency conversion system of claim 19 wherein one of the set of frequency doubling crystals comprises a rare earth aluminum huntite crystal.

21. The frequency conversion system of claim 20 wherein the rare earth aluminum huntite crystal comprises an yttrium lanthanum aluminum borate crystal.

22. A fiber laser system capable of simultaneously generating linearly-polarized laser radiation with peak powers from 10 kW to 500 kW, wavelengths of 1500-1575 nm, pulses with durations of 100 ps to 10 ns, pulse train repetition rates of 1 kHz to 10 MHz, average powers of 10-300 W, narrow spectral bandwidth less than 0.5 nm, and a predominately single spatial mode comprising:
  a master oscillator that generates linear polarized infrared laser radiation with a wavelength between 1500-1575 nm, pulses with an duration between 100 ps and 10 ns, a pulse train repetition rate between 1 kHz and 10 MHz, a spectral bandwidth less than 0.5 nm, and a predominately single spatial mode;
  a polarization-maintaining optical isolator configured to attenuate radiation propagating toward the master oscillator and transmitting the linear polarized laser radiation propagating away from the master oscillator; and
  a fiber amplifier optically coupled to the optical isolator and configured to amplify the linear polarized laser radiation transmitted through the optical isolator, wherein the fiber amplifier includes:
    a polarization-maintaining, large-mode-area, double-clad Er-doped gain fiber;
    one or more diode pump lasers emitting light of nominal wavelength 980 nm; and
    an optical coupler configured to couple light emitted from the one or more diode pump lasers into the double-clad Er-doped gain fiber.

23. The fiber laser system of claim 22 wherein the fiber amplifier systems further comprises one or more preamplifier stages preceding the power amplifier, wherein each of the one or more preamplifier stages comprises:
  a polarization-maintaining doped gain fiber having a core and at least a first cladding;
  one or more pumps providing pump power; and
  a pump coupler configured to optically couple the pump power into at least the core or the first cladding of the gain fiber.

24. The fiber laser system of claim 22 further comprising a large mode area polarization delivery fiber of length less than or equal to 5 m configured to guide the emission from the power amplifier to an application point.

25. The fiber laser system of claim 22 wherein the pump coupler for the power amplifier is an {n×1×1} fused star coupler, with n being an integer greater than or equal to one.

26. The fiber laser system of claim 22 wherein the pump coupler comprises an all fiber cladding coupler.

* * * * *